(12) United States Patent
Knobl et al.

(10) Patent No.: US 9,718,400 B2
(45) Date of Patent: Aug. 1, 2017

(54) MULTI-SENSORY ATTENTION ALERT SYSTEM

(71) Applicant: CONTINENTAL AUTOMOTIVE GMBH, Hannover (DE)

(72) Inventors: Karl-Heinz Knobl, Allendorf (DE); Hans-Wilhelm Rühl, Solms (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/424,571

(22) PCT Filed: Jul. 30, 2013

(86) PCT No.: PCT/EP2013/065953
§ 371 (c)(1),
(2) Date: Feb. 27, 2015

(87) PCT Pub. No.: WO2014/032886
PCT Pub. Date: Mar. 6, 2014

(65) Prior Publication Data
US 2015/0203030 A1    Jul. 23, 2015

(30) Foreign Application Priority Data
Aug. 29, 2012 (DE) .................. 10 2012 215 350

(51) Int. Cl.
*B60Q 1/00* (2006.01)
*B60Q 5/00* (2006.01)
(Continued)

(52) U.S. Cl.
CPC ............... *B60Q 5/006* (2013.01); *B60Q 1/00* (2013.01); *B60Q 9/00* (2013.01); *B60Q 9/008* (2013.01);
(Continued)

(58) Field of Classification Search
CPC .......... B60Q 5/006; B60Q 9/00; B60Q 9/008; B60Q 1/00; G08G 1/161
(Continued)

(56) References Cited

U.S. PATENT DOCUMENTS 7,958,962 B2 * 6/2011 Dukart ................ B60R 21/0136
  180/274
8,538,674 B2 * 9/2013 Breuer .......................... 340/436
(Continued)

FOREIGN PATENT DOCUMENTS

DE         103 22 557 A1    12/2004
DE    10 2004 005 073 A1     8/2005
(Continued)

*Primary Examiner* — Hoi Lau
(74) *Attorney, Agent, or Firm* — Cozen O'Connor

(57) ABSTRACT

A multi-sensory attention alert device for a vehicle includes a sensor arrangement, a warning signal emission arrangement for emitting haptic, acoustic and optical warning signals to the vehicle driver, and a control unit for analyzing and assessing the recorded measurement values and for controlling the warning signal emission arrangement. The direction of a potential source of danger can be indicated by emitting warning signals that address multiple sensory organs of the driver, and the direction of an interface can be indicated whose operation, by the driver, constitutes a counter measure for avoiding the dangerous situation.

8 Claims, 2 Drawing Sheets

(51) Int. Cl.
*B60Q 9/00* (2006.01)
*G01C 21/36* (2006.01)
*G02B 27/01* (2006.01)
*B60W 50/16* (2012.01)

(52) U.S. Cl.
CPC ......... *G01C 21/3697* (2013.01); *G02B 27/01* (2013.01); *B60W 50/16* (2013.01); *G02B 2027/014* (2013.01)

(58) Field of Classification Search
USPC ........ 340/435, 439, 436, 988, 903; 701/301, 701/300, 53, 41, 70, 96
See application file for complete search history.

(56) References Cited

U.S. PATENT DOCUMENTS

| | | | |
|---|---|---|---|
| 2001/0008992 A1* | 7/2001 | Saito | G01S 11/12 |
| | | | 701/301 |
| 2002/0039070 A1 | 4/2002 | Ververs et al. | |
| 2004/0049344 A1* | 3/2004 | Simon | G08G 1/161 |
| | | | 701/301 |
| 2005/0073433 A1* | 4/2005 | Gunderson | B60Q 9/006 |
| | | | 340/903 |
| 2005/0258977 A1* | 11/2005 | Kiefer | G08G 1/16 |
| | | | 340/903 |
| 2005/0280519 A1 | 12/2005 | Nagata | |
| 2006/0162985 A1* | 7/2006 | Tanaka | B60R 21/0134 |
| | | | 180/279 |
| 2007/0210906 A1 | 9/2007 | Knoll et al. | |
| 2007/0244641 A1* | 10/2007 | Altan | B60Q 9/008 |
| | | | 701/300 |
| 2007/0257783 A1* | 11/2007 | Matsumoto | B60K 6/445 |
| | | | 340/425.5 |
| 2008/0201039 A1* | 8/2008 | Matsuoka | B60W 50/16 |
| | | | 701/41 |
| 2008/0297727 A1 | 12/2008 | Mori | |
| 2009/0192683 A1* | 7/2009 | Kondou | B60W 10/18 |
| | | | 701/53 |
| 2009/0231116 A1 | 9/2009 | Takahashi et al. | |
| 2010/0060441 A1* | 3/2010 | Iwamoto | B60W 50/14 |
| | | | 340/435 |
| 2010/0295670 A1 | 11/2010 | Sato et al. | |
| 2011/0128139 A1* | 6/2011 | Tauchi | B60K 35/00 |
| | | | 340/439 |
| 2013/0030651 A1* | 1/2013 | Moshchuk | G08G 1/166 |
| | | | 701/41 |
| 2013/0338877 A1* | 12/2013 | Straus | G08G 1/161 |
| | | | 701/41 |
| 2014/0176350 A1* | 6/2014 | Niehsen | B62D 15/025 |
| | | | 340/988 |
| 2015/0203030 A1* | 7/2015 | Knobl | B60Q 9/00 |
| | | | 340/438 |

FOREIGN PATENT DOCUMENTS

| | | |
|---|---|---|
| DE | 102005059906 A1 | 6/2007 |
| DE | 102007015432 A1 | 10/2008 |
| DE | 10 2007 054 562 A1 | 5/2009 |
| DE | 10 2008038831 A1 | 2/2010 |
| DE | 102009050559 A1 | 4/2011 |
| DE | 102010018401 A1 | 8/2011 |
| EP | 2011711 | 1/2009 |
| EP | 2226217 | 9/2010 |
| JP | 2003291688 A | 10/2003 |
| WO | WO 2007/049995 A1 | 5/2007 |

* cited by examiner

MULTI-SENSORY ATTENTION ALERT SYSTEM

CROSS-REFERENCE TO RELATED APPLICATIONS

This is a U.S. national stage of application No. PCT/EP2013/065953, filed on 30 Jul. 2013, which claims priority to the German Application No. DE 10 2012 215 350.0 filed 29 Aug. 2012, the content of both incorporated herein by reference.

BACKGROUND OF THE INVENTION

1. Field of the Invention

The present invention relates to safety engineering in vehicles. In particular, the invention relates to a multisensory attention drawing (i.e. alert) apparatus for a vehicle, a vehicle having a multisensory attention alert apparatus, the use of a multisensory attention alert apparatus in a road vehicle, a method for multisensory alerting of the attention of a driver, a program element and a computer-readable medium.

2. Related Art

Warning signals in vehicles are output visually by displays or audibly by warning tones. Examples thereof are static or flashing symbols on a dashboard, warning texts in displays, warning tones, for example if the seatbelt is not fastened, warning announcements via traffic radio and also haptic signals, such as a vibrating steering wheel.

Warning tones can also be combined with displays in order to awaken the attention of the driver and draw it to the display. The warning signals are usually unspecific in relation to the direction from which the hazard comes.

WO 2007/049995 A1 describes a system for detecting objects that is able to output an audible signal intended to emulate the natural sound of the detected object. A plurality of loudspeakers are provided that are able to output a sound that indicates the position of the object.

SUMMARY OF THE INVENTION

It is an object of the invention to increase road safety.

According to a first aspect of the invention, a multisensory attention drawing (i.e., alert) apparatus for a vehicle has a sensor arrangement, a warning signal output arrangement and a control unit.

The sensor arrangement captures measured values and the warning signal output arrangement outputs haptic, audible and visual warning signals to the driver of the vehicle.

The control unit analyzes the captured measured values and uses the captured measured values to assess whether or not there is a potential hazard situation that emanates from a potential hazard source. If the control unit assesses that there is a potential hazard situation of this kind, it can control the warning signal output arrangement such that the latter outputs warning signals to the driver of the vehicle that show the driver the direction in which the potential hazard source is located. It is also possible for the warning signal output arrangement to be controlled such that the output warning signals show the driver the direction in which a man/machine interface that, when operated by the driver, provides a countermeasure to avoid the potential hazard situation, is located in the vehicle.

It is important that the apparatus draws the attention of the driver in multisensory fashion by addressing several senses of the driver at the same time. This allows the attention of the driver to be drawn more effectively and there is a high probability of being able to assume that the driver reacts to the drawing of attention as desired, even if one of his sensory organs (ears, eyes or sense of touch) should not perceive the warning signals directed to the corresponding sensory organ.

The interplay of a plurality of warning signals, for example audible warning signals in combination with haptic warning signals or audible warning signals in combination with visual warning signals or visual warning signals in combination with haptic warning signals or haptic, audible and visual warning signals, addresses a plurality of sensory organs at the same time, and in this way it may be possible for the attention of the driver to be drawn more quickly, more effectively, more intuitively and more precisely, so that the driver can assess the potential hazard situation more quickly and initiate appropriate countermeasures.

In particular, provision may be made for at least some of the warning signals to simulate the potential hazard source so that the simplest and fastest possible mental association between warning signal and event is possible.

According to one embodiment of the invention, the multisensory attention drawing apparatus is designed for the performance of an audible and haptic or an audible and visual simulation of the potential hazard source by the warning signal output arrangement.

According to a further embodiment of the invention, the multisensory attention drawing (i.e., alert) apparatus is configured to communicate to the driver a possible countermeasure to be taken by the warning signal output arrangement simulating the sounds produced by such a countermeasure before the countermeasure is taken by the driver.

By way of example, brake sounds can be played in order to communicate to the driver that he should brake or swerve if possible.

According to a further embodiment of the invention, the multisensory attention drawing (i.e., alert) apparatus is configured to visually mark the potential hazard source on a head-up display of the vehicle. Paired with audible drawing of the attention of the driver, it can therefore be made easier for the driver to identify the precise location of the potential hazard source.

According to a further embodiment of the invention, the multisensory attention drawing apparatus is configured to output an audible warning signal by the warning signal output arrangement, which warning signal contains a situation-oriented direction information item by suggesting to the driver that it comes from the direction in which the potential hazard source or the interface is located.

By way of example, these audible warning signals are produced by a direction mixer that provides appropriate actuation for the loudspeakers distributed in the vehicle.

According to a further embodiment of the invention, the sensor arrangement of the vehicle has a vehicle sensor system and an ambient sensor system for capturing measured values. The measured values captured by the vehicle sensor system are vehicle data, such as acceleration data, speed data, position statements, and the ambient data are measured values obtained by the ambient sensor system, such as the distance to a particular object, the road conditions, the direction of movement and speed of the object and the like.

According to a further aspect of the invention, a vehicle having a multisensory attention drawing apparatus as described above and below is specified.

By way of example, the vehicle may be an automobile, an aircraft, such as a helicopter, airship or airplane, a rail vehicle or a water vehicle.

According to a further aspect of the invention, the use of a multisensory attention drawing apparatus as described above and below in a road vehicle for the multisensory amplification of warning signals that emanate from a potential hazard source is specified.

According to a further aspect of the invention, a method for multisensory drawing of the attention of a driver of a vehicle is specified in which measured values are captured and analyzed, and then the captured measured values are used to assess whether or not there is a potential hazard situation that emanates from a potential hazard source. A warning signal output arrangement can then be controlled such that either at least haptic and audible or visual and audible warning signals are output that show the driver the direction in which the potential hazard source is located and/or the direction in which an interface that, when operated by the driver, provides a countermeasure to avoid the potential hazard situation is located.

According to a further aspect of the invention, a program element is specified that, when executed on a processor of a multisensory attention drawing apparatus, prompts the multisensory attention drawing apparatus to perform the method steps described above and below.

According to a further aspect of the invention, a non-transitory computer-readable medium is specified that stores a computer program that, when executed on a processor of a multisensory attention drawing apparatus, prompts the multisensory attention drawing apparatus to perform the method steps described above and below.

The program element may be part of a piece of software that is stored on a processor of the vehicle. In this case, the processor may likewise be the subject matter of the invention. In addition, the program element may be a computer program that uses the invention right from the start, or a computer program that prompts an existing program to use the invention by virtue of an update.

BRIEF DESCRIPTION OF THE DRAWINGS

Exemplary embodiments of the invention are described below with reference to the figures, in which.

DETAILED DESCRIPTION OF THE PRESENTLY PREFERRED EMBODIMENTS

The illustrations in the figures are schematic and not to scale.

Where the same reference symbols are used in different figures in the description of the figures that follows, these denote elements that are the same or similar. Alternatively, elements that are the same or similar may be denoted by different reference symbols.

Figure 1:
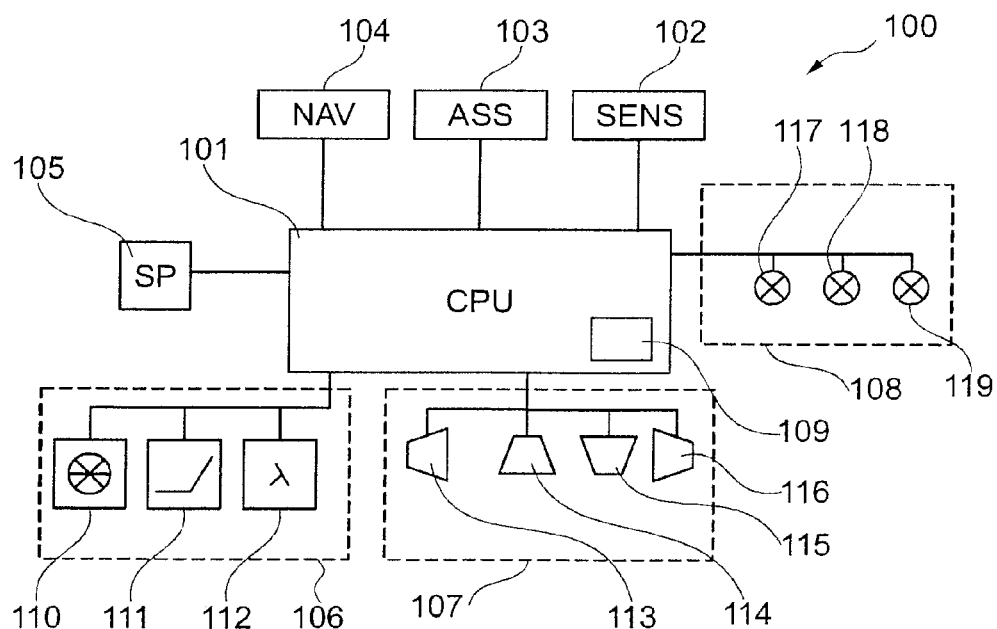
FIG. 1 shows a multisensory attention drawing (i.e., alert) apparatus for a vehicle according to an exemplary embodiment of the invention.

FIG. 1 shows a multisensory attention drawing apparatus 100 for a vehicle. The apparatus 100 has a control unit 101 in the form of a processor, which control unit is connected to various devices of the vehicle.

At this juncture, it should be pointed out that the communication between selected devices of the vehicle can be effected wirelessly in particular exemplary embodiments of the invention. Similarly, provision may be made for the communication to be effected by wire, wirelessly or exclusively by wire as options.

The multisensory attention drawing apparatus has a vehicle navigation apparatus 104, a vehicle assistance apparatus 103 and a vehicle sensor system 102.

The vehicle sensor system 102 may have both ambient sensors, such as radar sensors or lidar sensors, and vehicle sensors that record vehicle-internal measurement data. Examples thereof are ESP sensors for measuring accelerations, rotation speeds and the current vehicle position and speed.

In addition, a data memory 105 is provided as an example of a non-transitory computer-readable medium that can store the program element for performing the method according to the invention, for example.

Furthermore, the control unit 101 has what is known as a direction mixer 109 that can help to produce the audible warning signals.

For outputting the audible warning signals, a plurality of loudspeakers 113, 114, 115, 116 are provided that are distributed in the vehicle and that form the audible warning signal output unit 107.

What is known as the visual warning signal output unit 108 can be used to output visual warning and information signals by a plurality of visual output apparatuses 117, 118, 119.

The haptic warning signal output apparatus 106 can be used to output haptic warning signals. Examples of such signals are vibrations in the steering wheel by the vibration unit 110, vibrations in the driver's seat by the seat vibration unit 111 and vibrations in one or more of the pedals by the pedal vibration unit 112.

All these different output apparatuses can be addressed and activated by the control unit 101.

The invention now proposes a plurality of measures to allow the driver to sense the situation and corresponding warnings quickly and simply.

By way of example, the natural signals emanating from the hazard source can be amplified or simulated in order to attract the attention of the driver before the actual hazard source has become more of a threat.

By way of example, the navigation 104 provides the control unit 101 with advance notification of a school with the potential hazard of children suddenly crossing the road. As a warning signal, the noise of children is produced and played in the cockpit. In addition, the navigation 104 or the instrument cluster displays the appropriate road warning sign, for example on the head-up display 117.

As a further example, the navigation 104 expects a poor section of road ahead and the current speed of the vehicle is relatively high. As a warning signal, a heavy rolling sound is played. The haptic feedback from the steering wheel and/or seat simulates vibrations with statistics (a frequency pattern) that correspond to those of a poor road.

As a further example, a distance sensor in the sensor system 102 detects that the vehicle ahead is braking sharply. The infotainment system reduces the volume of the current sound source (e.g., radio) and mixes a distinctly audible brake sound into the channels of the front loudspeakers such that the audible location for the brake sound perceived by the driver is a location in front of the automobile.

It is also possible for audible warning signals to be presented such that they draw the attention in the desired direction. To this end, a direction mixing desk 109 is used in order to filter the channels to be reproduced via the loudspeaker channels of the automobile for the warning messages and warning signals such that the driver is provided with the subjective impression that the warning signal is coming from a particular direction. This direction is that direction in which the attention of the driver is intended to be drawn. The particular direction does not need to match the horizontal plane of the vehicle but rather can also run in the direction of the floor or the direction of the headliner of the vehicle.

By way of example, the case may arise that the handbrake of the vehicle is not fully released. An appropriate warning signal, or a warning message, is prefiltered in accordance with the binaural auditory response of the human ear such that the signal sounds as though it were coming from the direction of the handbrake.

It is also possible for the front lidar to detect a screen of fog in advance. The trip assistant 103 outputs the advice: "The switch for the fog lamp and the rear fog lamp is located . . . ". The advice is prefiltered in accordance with the binaural auditory response of the human ear, so that the signal sounds as though it were coming from the direction of the switch. The illumination of the switch can simultaneously be switched on or flash.

Figure 2:
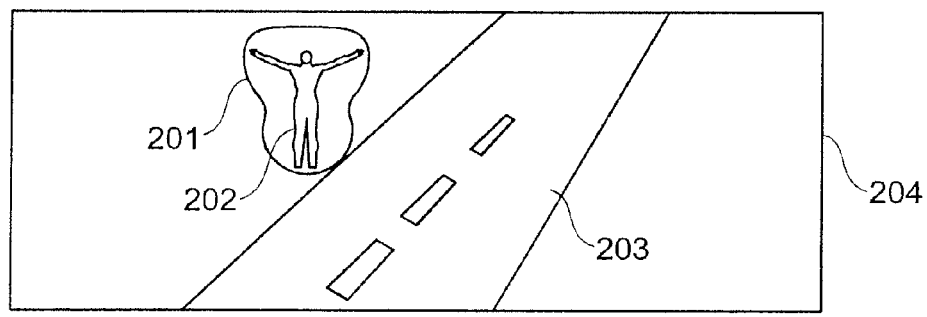
FIG. 2 shows the image that a driver can see through the windshield of a vehicle with a head-up display according to an exemplary embodiment of the invention.

It is also possible for a plurality of arrangements to be used at the same time in order to produce direction-oriented information and to draw the attention of the driver in the desired direction. By way of example, in addition to the noise of children described above from the direction of the school, it is also possible for the head-up display to mark the hazardous area 201 next to the road in the windshield 204. This is shown in FIG. 2, in which the road profile 203 can be seen through the windshield 204. At the left-hand edge of the road, there is a schoolchild 202, who is visually highlighted by the marker 201 that encircles the child in the head-up display.

It is also possible for the output of the rolling sound described above to be simultaneously accompanied by the production of a vibration in the steering wheel and/or seat in order to draw the attention of the driver to the road.

The various warning signals can be linked to one another such that the driver intuitively learns the type, location and hazard potential of the hazard source by virtue of several of his senses being addressed in different ways. The system is also capable of quickly and effectively notifying the driver of countermeasures that he can take in order to avoid the hazard situation.

This can also include drawing the attention of the driver to the button for the hazard warning lights when there is the threat of a queue forming on the freeway.

Figure 3:
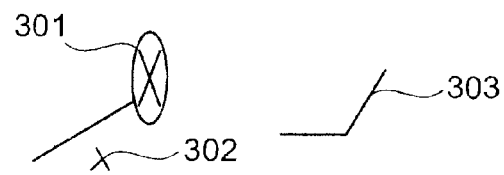
FIG. 3 shows devices for a vehicle according to an exemplary embodiment of the invention.

FIG. 3 shows the steering wheel 301 of a vehicle, the gas pedal 302 of the vehicle and the vehicle seat 303. All three apparatuses can be addressed by vibration sensors and prompted to vibrate, so that the thighs and back, hands and feet of the driver can be provided with vibration information.

By way of example, vibration in the gas pedal could mean that the driver needs to reduce his speed.

Hence, existent weak warning signals that emanate from a potential or actual hazard source can be amplified. It is thus possible for warning signals that the driver expects in conjunction with the corresponding hazard source to be stored and to be reproduced as required.

In particular, the invention proposes not taking individual measures but rather bundling a plurality of arrangements in order to draw attention in a direction-oriented and effective manner. By way of example, spoken messages can be provided in conjunction with direction-oriented binaural processing. It is also possible for a visual signal to be output in conjunction with direction-oriented binaural processing. Visual and/or audible signals can also be output in conjunction with a vibrating steering wheel or a vibrating seat.

Messages or audible warning signals can be produced by a direction mixing desk in order to filter the channels to be reproduced via the loudspeaker channels of the automobile for the warning messages and warning signals such that the driver is provided with the subjective impression that the warning signal is coming from a particular direction (namely the one to which the attention of the driver is intended to be drawn). The particular direction does not need to match the horizontal plane of the vehicle but rather may also point to the floor or the headliner of the vehicle. The signals can be either prefiltered and stored on a multichannel basis or stored on a single-channel basis and conditioned on a multichannel basis depending on direction during reproduction.

Figure 4:
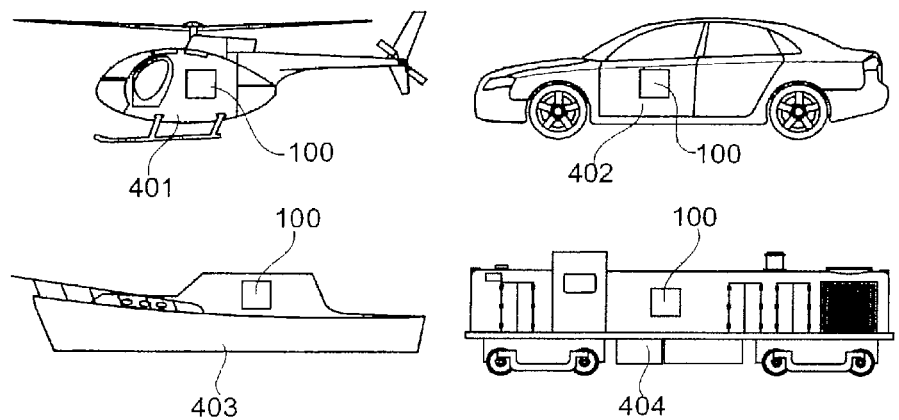
FIG. 4 shows various vehicles according to exemplary embodiments of the invention.

FIG. 4 shows a plurality of vehicles according to exemplary embodiments of the invention. By way of example, the vehicle may be a helicopter 401, a motor vehicle 402, a ship 403 or a locomotive 404. All of the vehicles have a multisensory attention drawing apparatus.

Figure 5:
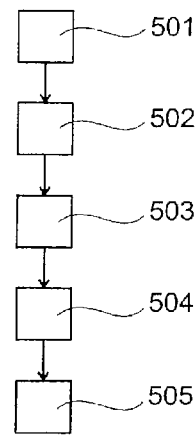
FIG. 5 shows a flowchart for a method according to an exemplary embodiment of the invention.

FIG. 5 shows a flowchart for a method according to an exemplary embodiment of the invention. In step 501, measured values are captured by the ambient sensor system and the vehicle sensor system. In step 502, the captured measured values are then analyzed and an assessment is made as to whether there is a potential hazard situation. In step 503, the warning signal output arrangement is then actuated, so that it shows the driver the direction in which the potential hazard source is located. In step 504, the driver is further shown where the interface that the driver should operate in order to avoid the potential hazard source is located in the vehicle. By way of example, this is the hazard warning lights or the handbrake. The driver can also be notified, in step 505, of which measure he should take next (brake, swerve, etc.).

The output signals may particularly be a combination of audible, haptic and visual signals in order to draw the attention of the driver quickly and effectively.

In addition, it should be pointed out that "comprising" and "having" do not exclude other elements or steps, and "a" or "an" does not exclude a large number. Furthermore, it should be pointed out that features or steps that have been described with reference to one of the above exemplary embodiments can also be used in combination with other features or steps from other exemplary embodiments described above. Reference symbols in the claims should not be regarded as restrictions.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A multisensory attention alert apparatus (100) for a vehicle, comprising:
    a sensor arrangement (102) configured to capture measured values;
    a warning signal output arrangement (106, 107, 108) configured to output haptic, audible and visual warning signals to a driver of the vehicle; and
    a control unit (101) configured to:
        analyze the captured measured values,
        use the captured measured values to assess whether there is a potential hazard situation that emanates from a potential hazard source (201), and
        control the warning signal output arrangement (106, 107, 108) such that the output warning signals indicate to the driver the direction in which a vehicle control interface that, when operated by the driver, provides a countermeasure to avoid the potential hazard situation is located,
    wherein the warning signal output arrangement (106, 107, 108) is configured to communicate to the driver a possible countermeasure to be taken by simulating sounds produced by such a countermeasure before the countermeasure is taken.

2. The multisensory attention alert apparatus (100) as claimed in claim 1, wherein the multisensory attention alert apparatus (100) is configured to perform visual marking of the potential hazard source on a head-up display (204) of the vehicle.

3. The multisensory attention alert apparatus (100) as claimed in claim 1, wherein the warning signal output arrangement (106, 107, 108) is configured to output an audible warning signal, which audible warning signal contains a situation-oriented direction information item that suggests to the driver that it comes from the direction in which the potential hazard source or the interface is located.

4. The multisensory attention alert apparatus (100) as claimed in claim 3, wherein the warning signal output arrangement (106, 107, 108) or the control unit (101) has a direction mixer (109) in order to produce the audible warning signal.

5. The multisensory attention alert apparatus (100) as claimed in claim 1, wherein the sensor arrangement (102) has a vehicle sensor system and an ambient sensor system for capturing measured values, wherein the measured values are vehicle data and/or ambient data.

6. A vehicle (401, 402, 403) having a multisensory attention alert apparatus (100) as claimed in claim 1.

7. A method for multisensory alert of the attention of a driver, comprising:
    capturing measured values;
    analyzing the captured measured values;
    using the captured measured values to assess whether there is a potential hazard situation that emanates from a potential hazard source;
    controlling a warning signal output arrangement (106, 107, 108) such that warning signals are output that indicate to the driver the direction in which a vehicle control interface that, when operated by the driver, provides a countermeasure to avoid the potential hazard situation is located; and
    controlling the warning signal output arrangement (106, 107, 108) to communicate to the driver a possible countermeasure to be taken by simulating sounds produced by such a countermeasure before the countermeasure is taken.

8. A non-transitory computer-readable medium (105) that stores a computer program that, when executed on a processor of a multisensory attention alert apparatus (100), prompts the multisensory attention alert apparatus (100) to perform the following steps:
    capturing measured values;
    analyzing the captured measured values;
    using the captured measured values to assess whether there is a potential hazard situation that emanates from a potential hazard source;
    controlling a warning signal output arrangement (106, 107, 108) such that warning signals are output that indicate to the driver the direction in which a vehicle control interface that, when operated by the driver, provides a countermeasure to avoid the potential hazard situation is located; and
    controlling the warning signal output arrangement (106, 107, 108) to communicate to the driver a possible countermeasure to be taken by simulating sounds produced by such a countermeasure before the countermeasure is taken.

* * * * *